US010255581B2

United States Patent
Singh et al.

(10) Patent No.: US 10,255,581 B2
(45) Date of Patent: Apr. 9, 2019

(54) FAST PLANNING HEURISTIC FOR BATCH AND INTERACTIVE PLANNING

(75) Inventors: Ripu Daman Singh, Southlake, TX (US); Anand Iyer, Flower Mound, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 73 days.

(21) Appl. No.: 12/607,043

(22) Filed: Oct. 27, 2009

(65) Prior Publication Data

US 2010/0114667 A1    May 6, 2010

Related U.S. Application Data

(63) Continuation-in-part of application No. 12/043,240, filed on Mar. 6, 2008.

(60) Provisional application No. 61/109,498, filed on Oct. 29, 2008, provisional application No. 60/893,428, filed on Mar. 7, 2007.

(51) Int. Cl.
   *G06Q 10/06* (2012.01)
   *G06Q 10/08* (2012.01)

(52) U.S. Cl.
   CPC .......... *G06Q 10/087* (2013.01); *G06Q 10/06* (2013.01); *G06Q 10/063* (2013.01)

(58) Field of Classification Search
   CPC .............. G06Q 10/0631; G06Q 10/063; G06Q 10/087; G06Q 10/06
   See application file for complete search history.

(56) References Cited

U.S. PATENT DOCUMENTS

| | | |
|---|---|---|
| 6,112,126 A | 8/2000 | Hales et al. |
| 6,546,303 B1 | 4/2003 | Fried et al. |
| 6,748,287 B1 | 6/2004 | Hagen et al. |

(Continued)

FOREIGN PATENT DOCUMENTS

| | | | | |
|---|---|---|---|---|
| GB | 2448070 A | * | 10/2008 | ............. G06Q 10/06 |
| GB | 2464829 A | * | 5/2010 | ............. G06Q 10/06 |

OTHER PUBLICATIONS

Joseph Pemberton et al., "Making Locally Optimal Decisions on Graphs with Cycles", UCLA Computer Science Department Technical Report No. 920004, Mar. 20, 1992, pp. 1-25. (Year: 1992).*

(Continued)

*Primary Examiner* — Amanda Gurski
(74) *Attorney, Agent, or Firm* — Spencer Fane LLP; Steven J. Laureanti

(57) ABSTRACT

A system and method is disclosed for incremental planning using a list based heuristic. The system includes a database storing supply chain entity data and a server system coupled with the database. The server system receives demand for one or more end items from one or more of the supply chain entities within a supply chain network and collapses the supply chain network into one or more flowpaths for each of the one or more end items. The server system also sorts the one or more flowpaths based on one or more rules or parameters stored in the database and reduces the one or more flowpaths using constraints stored in the database. The server system further generates a supply chain plan by solving the received demand using a list based heuristic stored in the database and communicates the generated supply chain plan to the one or more supply chain entities.

21 Claims, 4 Drawing Sheets

(56) References Cited

U.S. PATENT DOCUMENTS

| | | | |
|---|---|---|---|
| 7,218,980 | B1 | 5/2007 | Orshansky et al. |
| 7,225,981 | B2 | 6/2007 | Jongebloed |
| 8,036,921 | B2 | 10/2011 | Kumar et al. |
| 2002/0138324 | A1 | 9/2002 | Zarefoss et al. |
| 2005/0004826 | A1 | 1/2005 | Chen et al. |
| 2005/0004831 | A1* | 1/2005 | Najmi ............... G06Q 10/06 705/7.22 |
| 2005/0177435 | A1 | 8/2005 | Lidow |
| 2006/0206411 | A1 | 9/2006 | Rau et al. |
| 2006/0241986 | A1* | 10/2006 | Harper ............... G06N 3/126 705/7.26 |
| 2006/0282422 | A1* | 12/2006 | Al-Omari ..................... 707/4 |

OTHER PUBLICATIONS

Search Report for Taiwan Invention Patent Application No. 098136744; dated Dec. 5, 2014; p. 1.
Joseph Pemberton et al., "Making Locally Optimal Decisions on Graphs with Cycles", UCLA Computer Science Department Technical Report No. 920004, Mar. 20, 1992, pp. 1-25.
Joseph C. Pemberton et al., "Incremental Search Algorithms for Real-Time Decision Making", In: Proceedings 2nd AI Planning Systems Conf. (AIPS-94d) Chicago, Jun. 1994, pp. 1-6.
Robert Benson, "Automated Incremental Production Planning Techniques for the Semiconductor Industry", Department of Industrial Engineering and Operations Research University of California at Berkley, Oct. 7, 1994, pp. 1-40.
Search Report for Taiwan Invention Patent Application No. 097108176, Oct. 15, 2013.

\* cited by examiner

FAST PLANNING HEURISTIC FOR BATCH AND INTERACTIVE PLANNING

CROSS-REFERENCE TO RELATED APPLICATIONS

This application is a continuation-in-part (CIP) of U.S. patent application Ser. No. 12/043,240, filed on 6 Mar. 2008 and entitled "Sentient Optimization for Continuous Supply Chain Management," which claims the benefit of U.S. Provisional Patent Application Ser. No. 60/893,428, filed 7 Mar. 2007, entitled "Incremental Planning." This application also claims priority to U.S. Provisional Patent Application Ser. No. 61/109,498, filed 29 Oct. 2008, entitled "Fast Planning Heuristic for Batch and Incremental Planning."

U.S. patent application Ser. No. 12/043,240, U.S. Provisional Patent Application Ser. No. 60/893,428, and U.S. Provisional Patent Application Ser. No. 61/109,498 are assigned to the assignee of the present application. The subject matter disclosed in U.S. patent application Ser. No. 12/043,240, U.S. Provisional Patent Application Ser. No. 60/893,428, and U.S. Provisional Patent Application Ser. No. 61/109,498 are hereby incorporated by reference into the present disclosure as if fully set forth herein. The present invention hereby claims priority under 35 U.S.C. § 119(e) to U.S. Provisional Patent Application Ser. No. 60/893,428 and U.S. Provisional Patent Application Ser. No. 61/109,498.

TECHNICAL FIELD OF THE INVENTION

This invention relates generally to supply chain planning, and more particularly to incremental planning using a list based heuristic.

BACKGROUND OF THE INVENTION

A supply chain plan describes items to be procured and operations to be performed by entities within a supply chain network, in order to deliver products, goods, or services to another entity within the supply chain network. Typically, an entity collects data for the supply chain plan and runs an optimization algorithm during a specified time interval (i.e., daily, weekly), to produce the supply chain plan. However, traditional optimization algorithms require a representation of the complete supply chain plan in memory, which is a latency and is undesirable because it wastes valuable time resources in creating a huge in memory model of the complete supply chain.

In addition, in order to generate an optimal supply chain plan, traditional optimization algorithms traverse the supply chain data by backward and forward propagating along all the paths stored in memory. This traversal is repeated unnecessarily for each pass of the optimization algorithm, which is a latency and is undesirable. In addition, because of the complexity and the amount supply chain data stored in memory, a typical run-time for generating an optimal supply chain plan may be, for example, 10-12 hours. Once the supply chain plan is generated, the entity distributes the supply chain plan to other entities within the supply chain network and then repeats the process during the next specified time interval.

However, shortly after, if not immediately after, the supply chain plan is generated and distributed to the other entities within the supply chain network, various perturbations (i.e., changes or events) often occur that renders the generated supply chain plan infeasible. Such perturbations may include, for example, new demands, changes in capacity, changes in inventory, and the like. In addition, because the supply chain plan is only generated during specified time intervals and the run-time is significant in duration (i.e., 10-12 hours), the entity is not able to re-optimize, or otherwise adjust the supply chain plan to a state of feasibility, until the next specified time interval.

As a result, conventional efforts to re-optimize or otherwise adjust the supply chain plan to a state of feasibility, often involves ad hoc changes that are not optimal. In addition, conventional efforts to reduce the duration of the run-time are disadvantageous, because the speed of optimization is typically incompatible with the quality of the optimization. That is, these conventional efforts to reduce the duration of the run-time adversely affect the quality of the adjustments to the supply chain plan. This inability to reduce the duration of the run-time and to re-optimize or otherwise adjust the supply chain plan to a state of feasibility, based on these perturbations is undesirable.

SUMMARY OF THE INVENTION

A system for incremental planning using a list based heuristic is disclosed. The system includes a database storing supply chain entity data and a server system coupled with the database. The server system is configured to receive demand for one or more end items from one or more of the supply chain entities within a supply chain network and collapse the supply chain network into one or more flowpaths for each of the one or more end items. The server system is further configured to sort the one or more flowpaths based on one or more rules or parameters stored in the database and reduce the one or more flowpaths using constraints stored in the database. The server system is still further configured generate a supply chain plan by solving the received demand using a list based heuristic stored in the database and communicate the generated supply chain plan to the one or more supply chain entities.

A method providing incremental planning using a list based heuristic is disclosed. The method provides for receiving demand for one or more end items from one or more of the supply chain entities within a supply chain network and collapsing the supply chain network into one or more flowpaths for each of the one or more end items. The method further provides for sorting the one or more flowpaths based on one or more rules or parameters stored in the database and reducing the one or more flowpaths using constraints stored in the database. The method still further provides for generating a supply chain plan by solving the received demand using a list based heuristic stored in the database and communicating the generated supply chain plan to the one or more supply chain entities.

A computer-readable medium embodied with software enabling incremental planning using a list based heuristic is disclosed. The computer-readable medium receives demand for one or more end items from one or more of the supply chain entities within a supply chain network and collapses the supply chain network into one or more flowpaths for each of the one or more end items. The computer-readable medium further sorts the one or more flowpaths based on one or more rules or parameters stored in the database and reduces the one or more flowpaths using constraints stored in the database. The computer-readable medium still further generates a supply chain plan by solving the received demand using a list based heuristic stored in the database and communicates the generated supply chain plan to the one or more supply chain entities.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
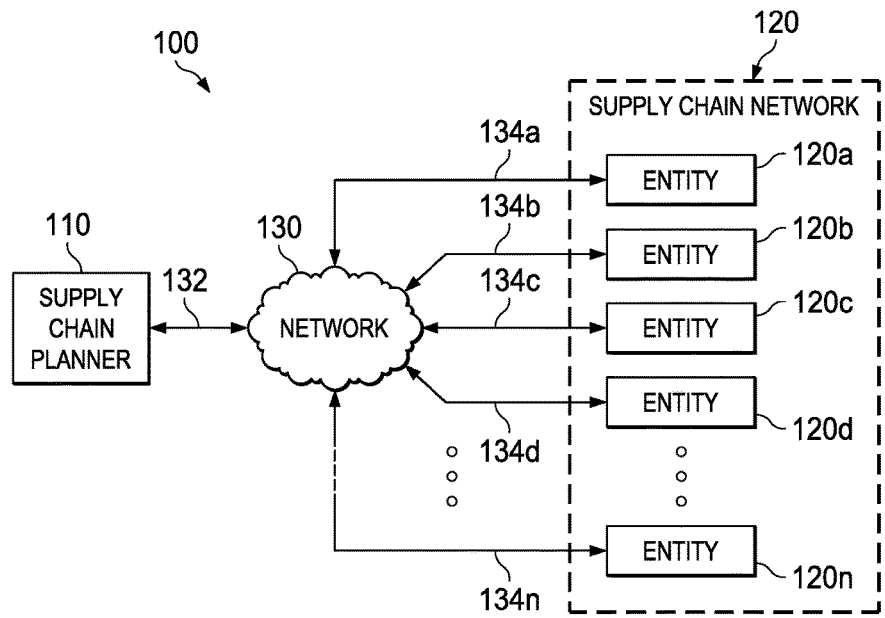
FIG. 1 illustrates an exemplary system according to a preferred embodiment.

FIG. 1 illustrates an exemplary system 100 according to a preferred embodiment. System 100 comprises a supply chain planner 110, supply chain network 120, a network 130, and communication links 132 and 134a-134n. Although a single supply chain planner 110, a single supply chain network 120, and a single network 130, are shown and described; embodiments contemplate any number of supply chain planners 110, any number of supply chain networks 120, and/or any number of networks 130, according to particular needs. In addition, or as an alternative, supply chain planner 110 may be integral to or separate from the hardware and/or software of any one of the supply chain networks 120.

In one embodiment, supply chain network 120 includes one or more supply chain entities 120a-120n. As an example only and not by way of limitation, one or more entities 120a-120n represents suppliers, manufacturers, distribution centers, retailers, and customers in supply chain network 120. A supplier may be any suitable entity that offers to sell or otherwise provides one or more materials to one or more manufacturers. A manufacturer may be any suitable entity that manufactures at least one end item. A manufacturer may use one or more materials during the manufacturing process to produce an end item. In this document, the phrase "end item" may refer to any manufactured, fabricated, assembled, or otherwise processed item or product. An end item may represent an item ready to be supplied to, for example, another one of the one or more entities 120a-120n such as a supplier, an item that needs further processing, or any other item. A manufacturer may, for example, produce and sell an end item to a supplier, another manufacturer, a distribution center, a retailer, a customer, or any other suitable person or entity. A distribution center may be any suitable entity that offers to sell or otherwise distributes at least one end item to one or more retailers or customers. A retailer may be any suitable entity that obtains one or more end items to sell to one or more customers.

Although a suppliers, manufacturers, distribution centers, retailers, and customers are described as separate and distinct entities within supply chain network 120, the same person or entity can simultaneously act as a supplier, manufacturer, distribution center, retailer and/or customer. For example, one or more entities 120a-120n acting as a manufacturer could produce an end item, and the same entity could act as a supplier to supply a material to another manufacturer. In addition, or as an alternative, supply chain network 120 illustrates one example supply chain or operational environment of the invention. Other environments and/or supply chains may be used without departing from the scope of the present invention.

In one embodiment, system 100 provides a supply chain plan that describes the flow (i.e., paths or flowpaths) of one or more items or one or more end items, such as, for example, materials, products, components, and resources through supply chain network 120 or other supply chain planning environments associated with system 100. As described below, supply chain planner 110 collapses supply chain network 120 of FIG. 3 into one or more flowpaths to incrementally adjust the supply chain plan using a list based heuristic.

In addition, or as an alternative, supply chain planner 110 also incrementally adjust the supply chain plan to a state of feasibility and/or optimality due to perturbations (i.e., perturbations to plan execution data) in the supply chain plan inputs relative to a previous supply chain planning session. For example, the perturbations in the supply chain inputs may include, but are not limited to, new unforecasted orders, new orders, changes to existing orders or forecasts, changes to in-transit shipments, changes to work in progress or work in process, changes in inventory, new capacity, reduced capacity, changes to external supply, and the like. In addition, according to one example, these perturbations (i.e., changes or events) may be classified into categories such as, for example, supply changes, inventory changes, capacity changes, demand changes, and the like. Although example categories of perturbations are described, embodiments contemplate any type of perturbations, changes, events, or categories of perturbations, changes, and/or events, according to particular needs.

In one embodiment, supply chain planner 110 is coupled with network 130 using communications link 132, which may be any wireline, wireless, or other link suitable to support data communications between supply chain planner 110 and network 130 during operation of system 100. One or more entities 120a-120n in supply chain network 120 are coupled with network 130 using communications links 134a-134n, which may be any wireline, wireless, or other link suitable to support data communications between supply chain network 120 and network 130 during operation of system 100. Although communication links 132 and 134a-134n are shown as generally coupling supply chain planner 110 and supply chain network 120 to network 130, supply chain planner 110 and supply chain network 120 may communicate directly with each other, according to particular needs.

In another embodiment, network 130 includes the Internet and any appropriate local area networks (LANs), metropolitan area networks (MANS), or wide area networks (WANs) coupling supply chain planner 110 and supply chain network 120. For example, data may be maintained by supply chain planner 110 at one or more locations external to supply chain planner 110 and one or more entities 120a-120n of supply chain network 120 and made available to one or more associated users of supply chain network 120 using network 130 or in any other appropriate manner. Those skilled in the art will recognize that the complete structure and operation of communication network 130 and other components within system 100 are not depicted or described. Embodiments may be employed in conjunction with known communications networks and other components.

Figure 2:
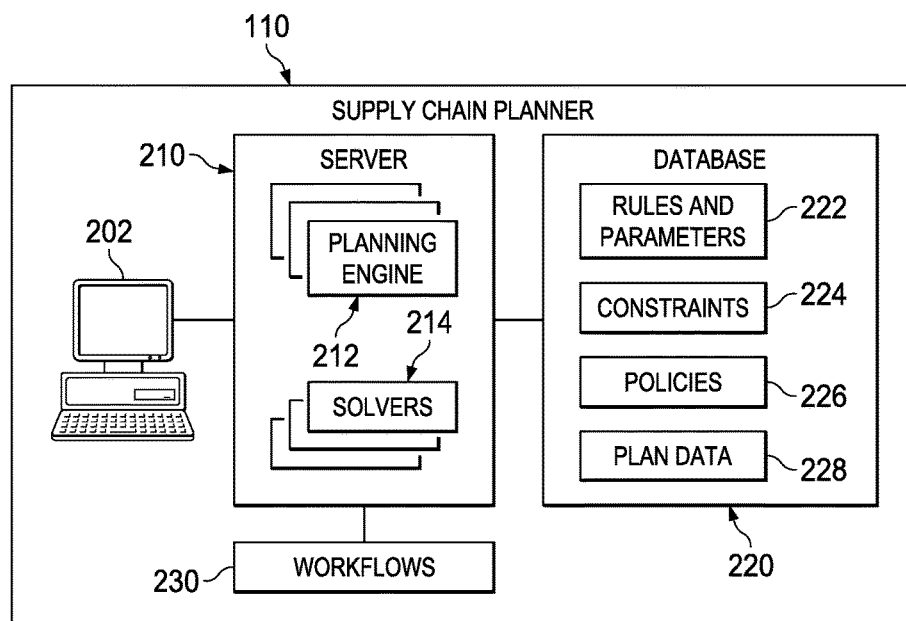
FIG. 2 illustrates the supply chain planner of FIG. 1 in greater detail in accordance with the preferred embodiment.

FIG. 2 illustrates supply chain planner 110 of FIG. 1 in greater detail in accordance with the preferred embodiment. Supply chain planner 110 comprises a computer 202, a server 210, a database 220, and workflows 230. Server 210 comprises one or more planning engines 212 and one or more solvers 214. Although server 210 is shown and described as comprising one or more planning engines 212 and one or more solvers 214, embodiments contemplate any suitable engine, solver, or combination of engines and/or solvers, according to particular needs.

Database 220 comprises one or more databases or other data storage arrangements at one or more locations, local to, or remote from, server 210. Database 220 may be coupled with server 210 using one or more local area networks (LANs), metropolitan area networks (MANs), wide area networks (WANs), network 130, such as, for example, the Internet, or any other appropriate wire line, wireless, or other links. Database 220 stores data that may be used by server 210. Database 220 includes, for example, rules and parameters 222, constraints 224, policies 226, and plan data 228. Although database 220 is shown and described as including rules and parameters 222, constraints 224, policies 226, and plan data 228, embodiments contemplate any suitable information or data, according to particular needs.

In one embodiment, supply chain planner 110 operates on one or more computers 202 that are integral to or separate from the hardware and/or software that support system 100. Computers 202 include any suitable input device, such as a keypad, mouse, touch screen, microphone, or other device to input information. An output device conveys information associated with the operation of supply chain planner 110 and supply chain network 120, including digital or analog data, visual information, or audio information. Computers 202 include fixed or removable computer-readable storage media, such as, for example, magnetic computer disks, CD-ROM, or other suitable media to receive output from and provide input to system 100. Computers 202 include one or more processors and associated memory to execute instructions and manipulate information according to the operation of system 100.

In one embodiment, the memory associated with one or more computers 202 comprises any of a variety of data structures, arrangements, and/or compilations configured to store and facilitate retrieval of information. The memory may, for example, comprise one or more volatile or non-volatile memory devices. Although the memory is described as residing within one or more computers 202, the memory may reside in any location or locations that are accessible by one or more computers 202 or the one or more processors. The memory receives and stores information related to supply chain planning operations of system 100. The one or more processors, processes information stored in the memory and performs supply chain planning operations for supply chain network 120. The memory may store and the one or more processors may process any suitable information to perform supply chain planning operations in system 100.

Although a single computer 202 is shown in FIG. 2, supply chain planner 110 and one or more entities 120a-120n of supply chain network 120 may each operate on separate computers 202 or may operate on one or more shared computers 202. Each of these one or more computers 202 may be a work station, personal computer (PC), network computer, notebook computer, personal digital assistant (PDA), cell phone, telephone, wireless data port, or any other suitable computing device.

In an embodiment, one or more users may be associated with supply chain planner 110 and/or one or more entities 120a-120n of supply chain network 120. These one or more users may include, for example, a "planner" handling planning and/or one or more related tasks within system 100. In addition, or as an alternative, these one or more users within system 100 may include, for example, one or more computers 202 programmed to autonomously handle planning and/or one or more related tasks within system 100.

Server 210 may support one or more planning engines 212 which generate supply chain plans based on inputs received from one or more planners and/or database 220, as described more fully below. Plan data 328, within database 220, may include data representing supply chain plans generated by one or more planning engines 212 and may be used by planners within system 100, according to particular needs. In general, a planning cycle may include a supply chain planning session and a period of time separating the supply chain planning session from a subsequent supply chain planning session. Supply chain planner 110, and in particular, server 210, stores and/or accesses various rules, parameters, constraints, policies, planning data, flowpaths, flowpath lists, and workflows associated with supply chain network 120.

As discussed above, supply chain planner 110 collapses supply chain network 120 into one or more flowpaths to incrementally adjust the supply chain plan using a list based heuristic. In addition, as discussed above, supply chain planner 110 may incrementally adjust the supply chain plan, during the period of time separating the supply chain planning sessions to a state of feasibility and/or optimality due to perturbations (i.e., perturbations to plan execution data) in the supply chain plan inputs relative to a previous supply chain planning session. In addition, as discussed above, these perturbations may be classified into categories, wherein each category of change may include a library of rules and parameters 222 and policies 326 for inducing different behavior based on the perturbations.

In one embodiment, one or more planning engines 212 generates one or more flowpaths, supply pictures, and demand pictures to incrementally adjust the supply chain plan. In another embodiment, one or more planning engines 212 generate one or more workflows 230 to incrementally and optimally adjust the supply chain plan. As an example only and not by way of limitation, workflows 230 include, a planning in increments with time advance workflow, a planning in increments with no time advance workflow, and/or any other suitable workflow that incrementally adjusts the supply chain plan to a state of feasibility and/or optimality due to perturbations in the supply chain plan inputs.

The planning in increments with time advance workflow may be invoked to evaluate or prescribe perturbations as a result of execution changes relative to a previous supply chain plan. In addition, or as an alternative, the planning in increments with time advance workflow is invoked where the perturbations (i.e., changes in demand, supply, inventory, and the like) occur during the period of time separating the supply chain planning sessions. The effect of these perturbations is superimposed on the previous supply chain plan to generate a new supply chain plan (i.e., an incremental adjustment of the previous supply chain plan). That is, the perturbations (i.e., changes in demand, supply, inventory, and the like) and the planning data associated with a previous supply chain plan are reconciled, to generate a new supply chain plan.

The planning in increments with no time advance workflow may be invoked to evaluate incremental changes which occur during the period of time separating the supply chain planning sessions, in situ. That is, a user associated with supply chain network 120 may consider the effect of different changes or events on an existing supply chain plan, such as, for example, during a what-if situation. Although examples of workflows 230 are described, workflows 230 may include any suitable workflow that incrementally adjusts the supply chain plan to a state of feasibility and/or optimality due to perturbations in the supply chain plan inputs during the period of time separating the supply chain planning sessions.

In one embodiment, one or more solvers 312 solve a limited cluster of problems associated with the perturbations in the supply chain inputs relative to the previous supply chain planning session. That is, each solver within each of the one or more solvers 312 focuses on only one kind of change or event that occurs during the period of time separating the supply chain planning sessions. In addition, or as an alternative, the actions taken by one or more solvers 312 with respect to the change or event may be dependent on that particular change or event. For example, if a user associated with one or more entities 120a-120n of supply chain network 120 cancels an order, then one or more solvers 312 may take actions that are dependent on the canceling of an order, and may be, for example, different from actions taken if the user associated with supply chain network 120 places a larger order for the same item or product. In essence, the action taken by one or more solvers 312 is dependent on the kind of change one or more solvers 312 is ameliorating.

In addition, one or more solvers 312 may include incremental planning solvers, such as, for example, a manufacturing planning solver, a distribution planning solver, an order planning solver, and any other solver. Although examples of one or more solvers 312 are described, one or more solvers 312 may include any suitable solver that solves any type of perturbations in the supply chain inputs.

In one embodiment, constraints 324 restrict the feasibility and/or optimization of a supply chain plan. As described more fully below, constraints 324 may be either hard constraints or soft constraints. Constraints 324 may be automatically generated in response to rules and parameters 222 and policies 326 stored in database 220, or constraints 324 may be created or modified in response to input received from perturbations in the supply chain plan inputs. In addition, constraints 324 may include additional constraints and/or additional sets of constraints, in order to preserve part of a previous supply chain plan generated during the previous supply chain planning session.

To further explain the operation of supply chain planner 110, an example is now given. In the following example, entity 120a of supply chain network 120 of FIG. 1 is a distributer of three products. Entity 120a outsources the manufacturing of the three products to two factories (i.e., in this example, entity 120b and 120c of supply chain network 120 of FIG. 1). Entity 120b has a capacity constraint of 4,000 units and entity 120c has a capacity constraint of 3,000 units. In addition, each of the three products, in this example, may be manufactured at either factory, that is, either entity 120b or 120c. However, the profit entity 120a may realize by manufacturing the three products at entity 120b or 120c is substantially different.

Continuing with this example, the demand for the first product is 1,000 units, the demand for the second product is 3,000 units, and the demand for the third product is 2,000 units. In addition, in this example, the profit for manufacturing the first product at entity 120b is $45 and the profit for manufacturing the first product at entity 120c is only $30. The profit for manufacturing the second product at entity 120b is $10 and the profit for manufacturing the second product at entity 120c is only $5. The profit for manufacturing the third product at entity 120b is $5 and the profit for manufacturing the first product at entity 120c is only $1.

Server 210 generates a supply chain plan, during a scheduled supply chain planning session, based on, at least the rules and parameters, constraints, policies, and plan data associated with this particular example and described above. The supply chain plan generated by server 210, in this example, may be such that profit is maximized and 1,000 units of the first product are to be manufactured at entity 120b, with an expected profit of $45,000, 3,000 units of the second product are to be manufactured at entity 120b, with an expected profit of $30,000, and 2,000 units of the third product are to be manufactured at entity 120c, with an expected profit of $10,000.

However, subsequent to the generation of the supply chain plan and during a period of time separating the supply chain planning session from a subsequent supply chain planning session, supply chain planner 110 receives a new order, increasing the demand for the first product by 500 units, that is, for a total demand of 1,500 units for the first product. In this example, the perturbation (i.e., the new order) may be classified into the category of "demand change", which as discussed above, may include a library of rules and parameters 222 and policies 326 for inducing the behavior based on the perturbation of the category "demand change". Supply chain planner 110 may incrementally and optimally adjust the supply chain plan to manufacture the new order (i.e., the additional demand for 500 units of the first product), at entity 120c, if, for example, the rules and parameters 222 and policies 326 prevent any changes to the capacity constraint associated with entity 120b.

Continuing with this example and subsequent to the incremental and optimal adjustment of the supply chain plan during the period of time separating the supply chain planning sessions, supply chain planner 110 receives another perturbation in the supply chain inputs. This perturbation is a notification that a particular regulation requires that the entirety of the first product must be manufactured in the same factory (i.e., entity 120b). However, based on this new perturbation in the supply chain input, the incremental adjustment of the supply chain plan, previously conducted, is no longer viable. That is, because this new perturbation requires that the entirety of the first product must be manufactured in the same factory (i.e., entity 120b) the additional demand for 500 units of the first product cannot be manufactured at entity 120c.

Although, as discussed above, constraints 324 may be either hard constraints or soft constraints. That is, in this example, the capacity constraint of 4,000 units associated with entity 120b may either be a hard constraint or a soft constraint as a matter of policy, judgment, and/or circumstances. In this example, supply chain planner 110 may communicate with entity 120b, or a user associated with entity 120b to determine if the capacity constraint of 4,000 units is a hard constraint or a soft constraint. Thereafter, supply chain planner 110 may incrementally and optimally adjust the supply chain plan to manufacture the new order (i.e., the additional demand for 500 units of the first product), at entity 120b, if, for example, the capacity constraint associated with entity 120b is a soft constraint or at least is a hard constraint that may be modified (i.e., maybe not a physical hard constraint).

Figure 3:
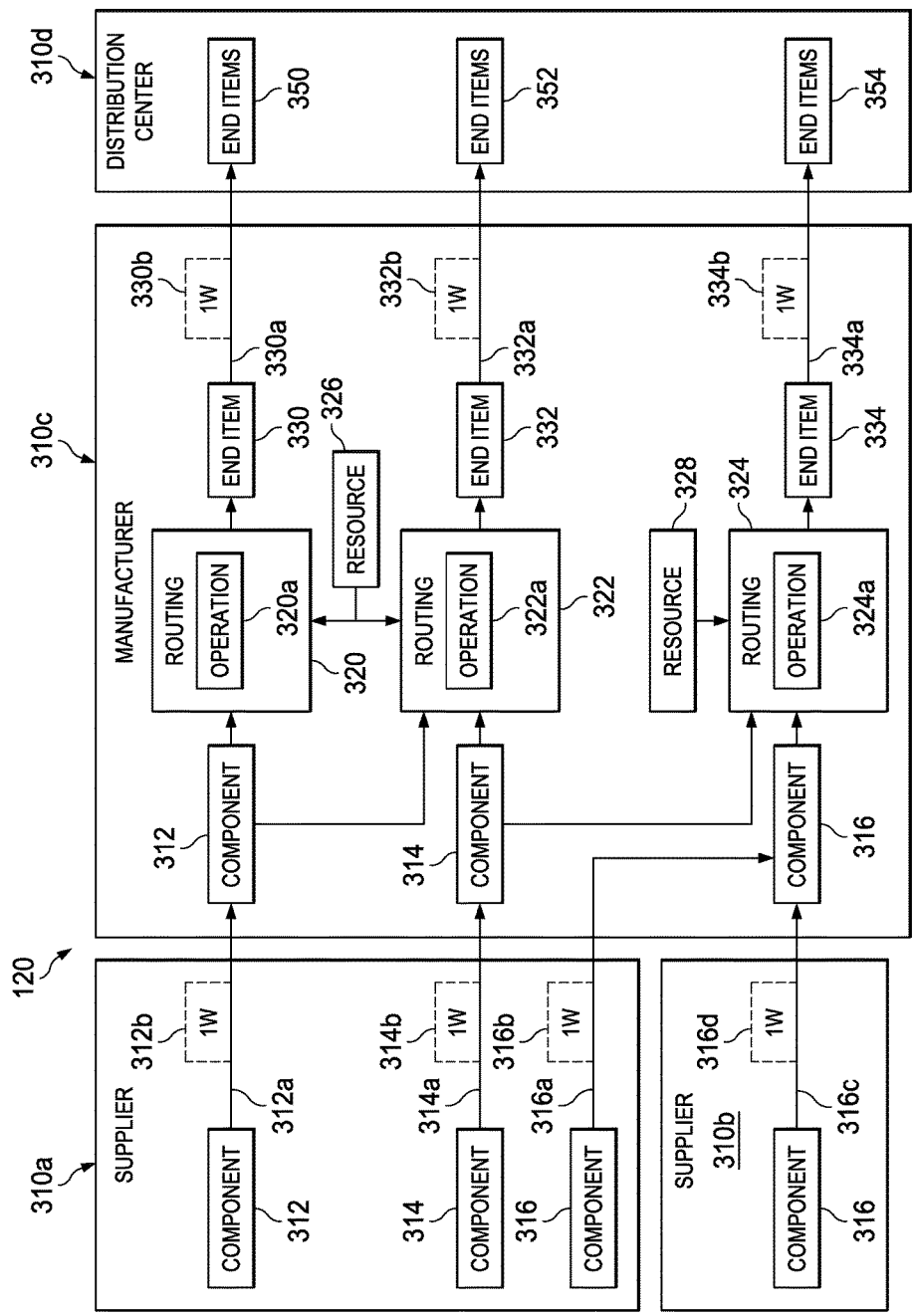
FIG. 3 illustrates the supply chain network of FIG. 1 in greater detail in accordance with the preferred embodiment.

FIG. 3 illustrates supply chain network 120 of FIG. 1 in greater detail in accordance with an exemplary embodiment. Supply chain network 120 comprises entities within the supply chain, such as, for example, supplier 310a, supplier 310b, manufacturer 310c, and distribution center 310d. For ease of illustration, supply chain network 120 of FIG. 1 is shown as four entities in FIG. 3: supplier 310a; supplier 310b; manufacturer 310c; and distribution center 310d, which correspond to, for example, entities 120a-120d of FIG. 1, respectively. In addition, although supply chain network 120 is shown and described as comprising suppliers 310a and 310b, manufacturer 310c, and distribution center 310d, embodiments contemplate any suitable supply chain entity or combination of entities, according to particular needs.

In one embodiment, manufacturer 310c includes routings 320, 322, and 324, operations 320a, 322a, and 324a and resources 326 and 328. Routings 320, 322, and 324 may represent one or more structures or apparatuses configured to receive one or more components (material) 312, 314, and 316 and perform at least one operation to transform the components 312, 314, and 316 into one or more end items 350, 352, and 354. In a particular embodiment, suppliers 310a and 310b provide components 312, 314, and 316 to routings 320, 322, and 324, and routings 320, 322, and 324 produce end items 350, 352, and 354 using operations 320a, 322a, and 324a and resources 326 and 328. For example, supplier 310a ships component 312 to routings 320 of manufacturer 310c, and routings 320 produces a first end item 350 using operation 320a and resource 326. In addition, supplier 310a may, at a later time, during, for example, another time bucket; begin shipping different component 312 to routings 320 of manufacturer 310c, to produce a second end item 350. Although components 312, 314, and 316 are shown and described, embodiments contemplate any number of components or any combination of components, without departing from the scope of the present invention.

To further explain the operation of supply chain network 120 of FIG. 3, an example is now given. In the following example, end items 350, 352, and 354 are available to satisfy orders (demand) at distribution center 310d. Although a particular number of end items are shown and described, embodiments contemplate any number of end items, according to particular needs. In addition, each of end items 350, 352, and 354 are shipped to distribution center 310d from manufacturer 310c via routes 330a, 332a, and 334a. In this example, shipping time 330b, 332b, and 334b between manufacturer 310c and distribution center 310d is 1 week. Although a particular shipping time is shown and described, embodiments contemplate any suitable shipping time.

Continuing with this example, end item 350 is produced along routing 320, using operation 320a, which consumes resource 326, and component 312. End item 352 is produced along routing 322, using operation 322a, which consumes resource 326, and components 312 and 314. End Item 354 is produced along routing 324, using operation 324a, which consumes resource 328, and components 314 and 316. Supplier 310a ships components 312, 314, and 316 to manufacturer 310c via routes 312a, 314a, and 316a. The shipping time 312b, 314b, and 316b in this example, between supplier 310a and manufacturer 310c is 1 week. Supplier 310b is a secondary supplier for component 316 and ships component 316 to manufacturer 310c via route 316c. In addition, in this example, the shipping time 316d, between supplier 310b and manufacturer 310c is also 1 week. Although a particular shipping time is shown and described, embodiments contemplate any suitable shipping time.

In one embodiment supply chain planner 110 collapses supply chain network 120 of FIG. 3 into one or more flowpaths and stores the one or more flowpaths in plan data 228 of database 220. In addition, or as an alternative, supply chain planner 110 loads the one or more flowpaths into memory only in the context of demand. For example, when supply chain planner 110 receives a demand for end item 350, the demand can be satisfied by flowpaths or time buckets (i.e., various options), within supply chain network 120. That is, the demand can be satisfied from the inventory at distribution center 310d, from the inventory at end item buffers 330, 332, and 334 of manufacturer 310c, it can be produced at manufacturer 310c consuming resource 326 and 328 and components 312, 314, and 316, or it can be sourced from suppliers 310a and 310b and produced at manufacturer 310c.

In one embodiment, supply chain planner 110 collapses supply chain network 120 into flowpaths that comprise all of the end nodes from which consumption occurs. As an example only and not by way of limitation, supply chain planner 110 collapses supply chain network 120 into four flowpaths for end item 350, shown below in TABLE 1. Although, a particular number of flowpaths are shown and described for end item 350; embodiments contemplate any number of flowpaths, without departing from the scope of the present invention.

TABLE 1

| FP | Element | |
|---|---|---|
| 1 | end item 350 @ distribution center 310d | |
| 2 | end item 350 @ manufacturer 310c | |
| 3 | component 312 @ manufacturer 310c | resource 326 @ manufacturer 310c |
| 4 | component 312 @ supplier 310a | resource 326 @ manufacturer 310c |

As shown in TABLE 1, flowpaths (FP's) 1 and 2 each have one element, while flowpaths 3 and 4 each have 2 elements. That is, there is supply/capacity available for both the elements of flowpaths 3 and 4. In addition, the consumption from the two elements of flowpaths 3 and 4 can occur in different time buckets. For example, as shown in FIG. 3, shipping time 312b is 1 week for component 312 to reach manufacturer 310c, via route 312a, to produce end item 350. That is, the consumption of component 312 at supplier 310a (flowpath 4—component 312 @ supplier 310a) occurs in a different time bucket than consumption of resource 326 at manufacturer 310c (flowpath 4—resource 326 @ manufacturer 310c).

Supply chain planner 110 further collapses supply chain network 120 into six flowpaths for end item 352, shown below in TABLE 2. Although, a particular number of flowpaths are shown and described for end item 352; embodiments contemplate any number of flowpaths, according to particular needs.

TABLE 2

| FP | Element | Element | Element |
|---|---|---|---|
| 1 | end item 352 @ distribution center 310d | | |
| 2 | end item 352 @ manufacturer 310c | | |
| 3 | component 312 @ manufacturer 310c | component 314 @ manufacturer 310c | resource 326 @ manufacturer 310c |
| 4 | component 312 @ supplier 310a | component 314 @ manufacturer 310c | resource 326 @ manufacturer 310c |
| 5 | component 312 @ manufacturer 310c | component 314 @ supplier 310a | resource 326 @ manufacturer 310c |
| 6 | component 312 @ supplier 310a | component 314 @ supplier 310a | resource 326 @ manufacturer 310c |

Furthermore, supply chain planner 110 collapses supply chain network 120 into eight flowpaths for end item 354, shown below in Table 3. Although, a particular number of flowpaths are shown and described for end item 354; embodiments contemplate any number of flowpaths, according to particular needs.

TABLE 3

| FP | Element | Element |
| --- | --- | --- |
| 1 | end item 354 @ distribution center 310d | |
| 2 | end item 354 @ manufacturer 310c | |
| 3 | component 314 @ manufacturer 310c | component 316 @ manufacturer 310c |
| 4 | component 314 @ manufacturer 310c | component 316 @ supplier 310a |
| 5 | component 314 @ supplier 310a | component 316 @ manufacturer 310c |

TABLE 3-continued

| FP | Element | Element |
| --- | --- | --- |
| 6 | component 314 @ manufacturer 310c | component 316 @ supplier 310b |
| 7 | component 314 @ supplier 310a | component 316 @ supplier 310a |
| 8 | component 314 @ supplier 310a | component 316 @ supplier 310b |

In one embodiment, supply chain planner 110 determines and sorts the order of the flowpaths (i.e., flowpaths 1, 2, 3, 4, etc.) using one or more business rules stored in rules and parameters 222 of database 220. As shown above, the flowpaths are sorted based on the priority, which may be predetermined by supply chain planner 110 or determined by rules and parameters 222 stored in database 220. Although a particular order of the flowpaths is shown and described, embodiments contemplate any suitable order of the flowpaths, according to particular needs.

In one embodiment, supply chain planner 110 applies one or more pruning techniques stored in rules and parameters 222 of database 220 to reduce the number of generated flowpaths. For example, when supply chain planner 110 receives a demand for end item 350 for a particular time bucket, supply chain planner 110 prunes out various flowpaths based on, for example, lead-time constraints stored in constraints 224 of database 220. As an example only, and not by way of limitation, TABLE 4 lists the flowpaths available to satisfy a demand in a particular week for end item 350. In addition, or as an alternative, TABLE 4 shows a time bucket-wise walk pattern ensuring consumption in a time bucket closest to the received demand, in for example, a just-in-time consumption. In addition, the walking of the time buckets may be reversed, filtered or sorted as per one or more business rules stored in rules and parameters 222 of database 220.

TABLE 4

| | Demand in Week 1 | | | | | |
| --- | --- | --- | --- | --- | --- | --- |
| 1 | end item 350 @ distribution center 310d | Wk1 | | | | |
| | Demand in Week 2 | | | | | |
| 1 | end item 350 @ distribution center 310d | Wk2 | Wk1 | | | |
| 2 | end item 350 @ manufacturer 310c | Wk1 | | | | |
| | Demand in Week 3 | | | | | |
| 1 | end item 350 @ distribution center 310d | Wk3 | Wk2 | Wk1 | | |
| 2 | end item 350 @ manufacturer 310c | Wk2 | Wk1 | | | |
| 3 | component 312 @ manufacturer 310c | Wk1 | | | | |
| 3 | resource 326 @ manufacturer 310c | Wk1 | | | | |
| | Demand in Week 4 | | | | | |
| 1 | end item 350 @ distribution center 310d | Wk4 | Wk3 | Wk2 | Wk1 | |
| 2 | end item 350 @ manufacturer 310c | Wk3 | Wk2 | Wk1 | | |
| 3 | component 312 @ manufacturer 310c | Wk2 | Wk1 | Wk1 | | |
| 3 | resource 326 @ manufacturer 310c | Wk2 | Wk2 | Wk1 | | |
| 4 | component 312 @ supplier 310a | Wk1 | | | | |
| 4 | resource 326 @ manufacturer 310c | Wk2 | | | | |
| | Demand in Week 5 | | | | | |
| 1 | end item 350 @ distribution center 310d | Wk5 | Wk4 | Wk3 | Wk2 | Wk1 |
| 2 | end item 350 @ manufacturer 310c | Wk4 | Wk3 | Wk2 | Wk1 | |
| 3 | component 312 @ manufacturer 310c | Wk3 | Wk2 | Wk1 | Wk2 | Wk1 | Wk1 |
| 3 | resource 326 @ manufacturer 310c | Wk3 | Wk3 | Wk3 | Wk2 | Wk2 | Wk1 |
| 4 | component 312 @ supplier 310a | Wk2 | Wk1 | Wk1 | | |
| 4 | resource 326 @ manufacturer 310c | Wk3 | Wk3 | Wk2 | | |

As shown in TABLE 4, flowpath1 is available to satisfy a demand in week1, that is, the on-hand for end item 350 @ distribution center 310d (end item 350 at distribution center 310d) will be consumed. Flowpath2 is available to satisfy a demand in week2, that is consumption can be from end item 350 @ distribution center 310d in the current time bucket (week2) or the previous time bucket (week1) or consumption can be from flowpath2 which is end item 350 @ manufacturer 310c (end item 350 at manufacturer 310c). In this example, there is supply for end item 350 at end item buffer 330 of manufacturer 310c in week1.

In another embodiment, supply chain planner 110 increases the number of flowpaths for each alternate fork in supply chain network 120. For example, if the number of manufacturers to produce an end item increases or the number of suppliers increases, the number of flowpaths generated by supply chain planner 110 also increases. That is, in this example, if another manufacturer or supplier is provided for end item 350, then supply chain planner 110 doubles the number of flowpaths from four to eight.

As an example only, and not by way of limitation, supply chain planner 110 prunes (i.e., removes) any time bucket(s) that do not have supply or capacity, as shown below in TABLE 5. For example, with respect to the demand in week5 of TABLE 4, if the capacity of resource 326 in week3 is zero, then supply chain planner 110 prunes the flowpaths for the demand in week5 to the following:

TABLE 5

Demand in Week 5

| # | Entity | | | | | |
|---|---|---|---|---|---|---|
| 1 | end item 350 @ distribution center 310d | Wk5 | Wk4 | Wk3 | Wk2 | Wk1 |
| 2 | end item 350 @ manufacturer 310c | Wk4 | Wk3 | Wk2 | Wk1 | |
| 3 | component 312 @ manufacturer 310c | | | Wk2 | Wk1 | Wk1 |
| 3 | resource 326 @ manufacturer 310c | | | Wk2 | Wk2 | Wk1 |
| 4 | component 312 @ supplier 310a | | Wk1 | | | |
| 4 | resource 326 @ manufacturer 310c | | Wk2 | | | |

In addition, with respect to the demand in week5 of TABLE 4, if the supply availability of component 312 in manufacturer 310c is zero in, for example, week2, then supply chain planner 110 prunes the flowpaths for the demand in week5 of TABLE 5 to the following:

TABLE 6

Demand in Week 5

| # | Entity | | | | | |
|---|---|---|---|---|---|---|
| 1 | end item 350 @ distribution center 310d | Wk5 | Wk4 | Wk3 | Wk2 | Wk1 |
| 2 | end item 350 @ manufacturer 310c | Wk4 | Wk3 | | Wk1 | |
| 3 | component 312 @ manufacturer 310c | | | | Wk1 | Wk1 |
| 3 | resource 326 @ manufacturer 310c | | | | Wk2 | Wk1 |
| 4 | component 312 @ supplier 310a | | Wk1 | | | |
| 4 | resource 326 @ manufacturer 310c | | Wk2 | | | |

In addition, or as an alternative, supply chain planner 110 stores the supply and capacity picture with its time bucketized availability (supply—consumption), as a Fact table in database 220. Supply chain planner 110 updates the fact table as consumption occurs and when the availability reaches zero the list is further pruned out.

In one embodiment, supply chain planner 110 generates a supply picture (TABLE 7), which shows, for example, which time bucket the supply is received. Supply chain planner 110 stores the supply chain picture in plan data 228 of database 220. For example, if one or more upstream components 312, 314, or 316 is shipped from supplier 310a or 310b to manufacturer 310c, then the one or more components 312, 314, or 316 show up as supply at the supplier 310a, supplier 310b or at the manufacturer 310c.

TABLE 7

| Entity | Item/Resource | Week | On Hand/Supply/Capacity |
|---|---|---|---|
| distribution center 310d | end item 350 | Wk1 | 20 |
| distribution center 310d | end item 352 | Wk1 | 20 |
| distribution center 310d | end item 354 | Wk1 | 20 |
| manufacturer 310c | end item 350 | Wk1 | 10 |
| manufacturer 310c | end item 352 | Wk1 | 10 |
| manufacturer 310c | end item 354 | Wk1 | 10 |
| manufacturer 310c | component 312 | Wk1 | 30 |
| manufacturer 310c | component 314 | Wk1 | 60 |
| manufacturer 310c | component 316 | Wk1 | 30 |
| supplier 310a | component 312 | Wk1 | 30 |
| supplier 310a | component 312 | Wk2 | 5 |
| supplier 310a | component 312 | Wk3 | 5 |
| supplier 310a | component 312 | Wk4 | 5 |
| supplier 310a | component 312 | Wk5 | 5 |
| supplier 310a | component 314 | Wk1 | 60 |
| supplier 310a | component 314 | Wk2 | 5 |
| supplier 310a | component 314 | Wk3 | 5 |
| supplier 310a | component 314 | Wk4 | 5 |
| supplier 310a | component 314 | Wk5 | 5 |
| supplier 310a | component 316 | Wk1 | 30 |
| supplier 310a | component 316 | Wk2 | 5 |
| supplier 310a | component 316 | Wk3 | 5 |
| supplier 310a | component 316 | Wk4 | 5 |
| supplier 310a | component 316 | Wk5 | 5 |
| supplier 310b | component 316 | Wk1 | 30 |
| supplier 310b | component 316 | Wk2 | 5 |
| supplier 310b | component 316 | Wk3 | 5 |
| supplier 310b | component 316 | Wk4 | 5 |
| supplier 310b | component 316 | Wk5 | 5 |
| manufacturer 310c | resource 326 | Wk1 | 30 |
| manufacturer 310c | resource 326 | Wk2 | 30 |
| manufacturer 310c | resource 326 | Wk3 | 30 |
| manufacturer 310c | resource 326 | Wk4 | 30 |
| manufacturer 310c | resource 326 | Wk5 | 30 |
| manufacturer 310c | resource 328 | Wk1 | 10 |
| manufacturer 310c | resource 328 | Wk2 | 10 |
| manufacturer 310c | resource 328 | Wk3 | 10 |
| manufacturer 310c | resource 328 | Wk4 | 10 |
| manufacturer 310c | resource 328 | Wk5 | 10 |

In another embodiment, supply chain planner 110 generates a demand picture (TABLE 8), which shows demand (i.e., orders or netted forecasts). Supply chain planner 110 stores the demand picture in plan data 228 of database 220. In addition, supply chain planner 110 may prioritize the demand picture using one or more business rules stored in rules and parameters 222 of database 220.

TABLE 8

| Entity | Sales_Model | Business Unit | Line | Week | Demand/Forecast |
|---|---|---|---|---|---|
| distribution center 310d | end item 350 | BU1 | L1 | Wk1 | 15 |
| distribution center 310d | end item 350 | BU1 | L1 | Wk2 | 15 |
| distribution center 310d | end item 350 | BU1 | L1 | Wk3 | 15 |
| distribution center 310d | end item 350 | BU1 | L1 | Wk4 | 15 |
| distribution center 310d | end item 350 | BU1 | L1 | Wk5 | 15 |
| distribution center 310d | end item 352 | BU2 | L1 | Wk1 | 15 |
| distribution center 310d | end item 352 | BU2 | L1 | Wk2 | 15 |
| distribution center 310d | end item 352 | BU2 | L1 | Wk3 | 15 |
| distribution center 310d | end item 352 | BU2 | L1 | Wk4 | 15 |
| distribution center 310d | end item 352 | BU2 | L1 | Wk5 | 15 |
| distribution center 310d | end item 354 | BU2 | L2 | Wk1 | 10 |
| distribution center 310d | end item 354 | BU2 | L2 | Wk2 | 10 |
| distribution center 310d | end item 354 | BU2 | L2 | Wk3 | 10 |
| distribution center 310d | end item 354 | BU2 | L2 | Wk4 | 10 |
| distribution center 310d | end item 354 | BU2 | L2 | Wk5 | 10 |

In one embodiment, supply chain planner 110 uses a list based heuristic to consume demand, which is configurable and extendible as per, for example, one or more business requirements stored in rules and parameters 222 of database 220 or business constraints stored in constraints 224 of database 220. In addition, or as an alternative, supply chain planner 110 uses the list based heuristic to walk the flowpath list in some order, walk the time buckets in some order, and consume and store the information. In addition, or as an alternative, based on the business objective stored in rules and parameters 222 of database 220, supply chain planner 110, sorts the flowpath lists by, for example, changing the consumption pattern.

In one embodiment, supply chain planner 110 solves the demands, in for example, a just-in-time based consumption pattern:
For each time bucket; assume ordering of first to last time bucket.
  For each demand; assume ordering of highest priority to least priority
    Get its flowpath list
    For each flowpath element; as per the ordering
      Get time bucket list; consume in a just-in-time pattern (i.e., walk back in time)

In another embodiment, supply chain planner 110 solves the demands, by for example, consuming actual on-hand first, and then in a just-in-time based consumption pattern:
For each time bucket; choose from first to last.
  For each demand; choose demand from highest priority to least priority
    Get its flowpath list
    For each flowpath element; as per the ordering
      Get time bucket list;
      Consume from current time bucket first
      Consume in a just-in-time pattern (i.e., walk back in time)

Although exemplary list based heuristics are shown and described, embodiments contemplate any heuristic or combination of heuristics for solving the demands. In addition, or as an alternative, supply chain planner 110 may short or satisfy late the demand, based on one or more business requirements stored in rules and parameters 222 of database 220. For example, supply chain planner 110 may satisfy late a demand by, for example, considering the flowpaths and time buckets that become available if the unsatisfied portion of the demand was pushed to the next time bucket.

Continuing with this example, supply chain planner 110 generates and stores commit against the demand data in plan data 228 of database 220, as shown in TABLE 9.

TABLE 9

| Entity | Item | Business Unit | Line | Week | Demand | Commit |
|---|---|---|---|---|---|---|
| distribution center 310d | end item 350 | BU1 | L1 | Wk1 | 15 | 15 |
| distribution center 310d | end item 350 | BU1 | L1 | Wk2 | 15 | 15 |
| distribution center 310d | end item 350 | BU1 | L1 | Wk3 | 15 | 15 |
| distribution center 310d | end item 350 | BU1 | L1 | Wk4 | 15 | 15 |
| distribution center 310d | end item 350 | BU1 | L1 | Wk5 | 15 | 5 |
| distribution center 310d | end item 352 | BU2 | L1 | Wk1 | 15 | 15 |
| distribution center 310d | end item 352 | BU2 | L1 | Wk2 | 15 | 15 |
| distribution center 310d | end item 352 | BU2 | L1 | Wk3 | 15 | 15 |
| distribution center 310d | end item 352 | BU2 | L1 | Wk4 | 15 | 15 |
| distribution center 310d | end item 352 | BU2 | L1 | Wk5 | 15 | 0 |
| distribution center 310d | end item 354 | BU2 | L2 | Wk1 | 10 | 10 |
| distribution center 310d | end item 354 | BU2 | L2 | Wk2 | 10 | 10 |
| distribution center 310d | end item 354 | BU2 | L2 | Wk3 | 10 | 10 |
| distribution center 310d | end item 354 | BU2 | L2 | Wk4 | 10 | 10 |
| distribution center 310d | end item 354 | BU2 | L2 | Wk5 | 10 | 10 |

In addition, supply chain planner 110 generates and stores Demand-Consumption Map data in plan data 228 of database 220, as shown in TABLE 10:

TABLE 10

| Buffer | Cons. | Cons. in Week | Demand | Qty | Demand in Week |
|---|---|---|---|---|---|
| end item 350 @ distribution center 310d | 15 | Wk1 | end item 350 | 15 | Wk1 |
| end item 350 @ distribution center 310d | 5 | Wk1 | end item 350 | 15 | Wk2 |
| end item 352 @ distribution center 310d | 15 | Wk1 | end item 352 | 15 | Wk1 |
| end item 352 @ distribution center 310d | 5 | Wk1 | end item 352 | 15 | Wk2 |
| end item 354 @ distribution center 310d | 10 | Wk1 | end item 354 | 10 | Wk1 |
| end item 354 @ distribution center 310d | 10 | Wk1 | end item 354 | 10 | Wk2 |
| end item 350 @ manufacturer 310c | 10 | Wk1 | end item 350 | 15 | Wk2 |
| end item 352 @ manufacturer 310c | 10 | Wk1 | end item 352 | 15 | Wk2 |
| end item 354 @ manufacturer 310c | 10 | Wk1 | end item 354 | 10 | Wk3 |
| component 312 @ manufacturer 310c | 15 | Wk1 | end item 350 | 15 | Wk3 |
| component 312 @ manufacturer 310c | 15 | Wk1 | end item 352 | 15 | Wk3 |
| component 314 @ manufacturer 310c | 15 | Wk1 | end item 352 | 15 | Wk3 |
| component 314 @ manufacturer 310c | 15 | Wk1 | end item 352 | 15 | Wk4 |
| component 314 @ manufacturer 310c | 10 | Wk1 | end item 354 | 10 | Wk4 |
| component 314 @ manufacturer 310c | 10 | Wk1 | end item 354 | 10 | Wk4 |
| component 316 @ manufacturer 310c | 10 | Wk1 | end item 354 | 10 | Wk4 |
| component 316 @ manufacturer 310c | 10 | Wk1 | end item 354 | 10 | Wk5 |
| component 312 @ supplier 310a | 15 | Wk1 | end item 350 | 15 | Wk4 |
| component 312 @ supplier 310a | 15 | Wk1 | end item 352 | 15 | Wk4 |
| component 312 @ supplier 310a | 5 | Wk2 | end item 350 | 15 | Wk5 |
| component 314 @ supplier 310a | | | | | |
| component 316 @ supplier 310a | | | | | |
| component 316 @ supplier 310b | | | | | |
| resource 326 @ manufacturer 310c | 15 | Wk1 | end item 350 | 15 | Wk3 |
| resource 326 @ manufacturer 310c | 15 | Wk1 | end item 352 | 15 | Wk3 |
| resource 326 @ manufacturer 310c | 15 | Wk2 | end item 350 | 15 | Wk4 |
| resource 326 @ manufacturer 310c | 15 | Wk2 | end item 352 | 15 | Wk4 |
| resource 326 @ manufacturer 310c | 5 | Wk3 | end item 350 | 15 | Wk5 |
| resource 328 @ manufacturer 310c | 10 | Wk2 | end item 354 | | Wk4 |
| resource 328 @ manufacturer 310c | 10 | Wk3 | end item 354 | | Wk5 |
| N/A | | N/A | end item 352 | 15 | Wk5 |

In one embodiment, supply chain planner 110 communicates the generated supply chain plan, to one or more users of supply chain network 120 either graphically and/or in tabular form. In one embodiment, supply chain planner 110 communicates the demands, the supply, consumption, availability picture for material and capacity and the demand-consumption map. In addition, or as an alternative, if any change in supply, capacity or demand occurs, then supply chain planner 110 triggers the list based heuristic to solve for the change using one or more solvers 214.

As an example only and not by way of limitation, if an increase in demand occurs, supply chain planner 110 solves for the increase in demand using one or more solvers 214. If the demand is unsatisfied, then supply chain planner 110 highlights the constraints and the related demands so that supply chain planner can plan a supply chain plan on top of the current supply chain plan. If the demand decreases, then supply chain planner 110 determines whether to free up supply and/or capacity and whether to re-plan shorted or late-ed demand. If the supply and/or capacity is increased, then supply chain planner 110 determines whether to make more supply and/or capacity available and whether to re-plan shorted or late-ed demand. If the supply and/or capacity decreases, then supply chain planner 110 solves for the decreased material supply and/or resource capacity using one or more solvers 214 and to identify the affected demand and to reduce the commit value of the affected demands and to re-plan the affected demands again.

In one embodiment, supply chain planner 110 applies a filtering technique stored in rules and parameters 222 of database 220 to filter the flowpaths and time buckets. For example, supply chain planner 110 filters in or out one or more locations used to satisfy a demand by selecting the manufacturers that are to plan the demand in or in the alternative, leave out the manufacturers that do not want the items in the demand to be made from, select or de-select the suppliers, and select or de-select the distribution centers. In addition, or as an alternative, supply chain planner 110 filters in or out one or more resources to satisfy a demand by selecting or de-selecting one or more resources to be used or not to be used, an selecting or de-selecting one or more routings. In addition, supply chain planner 110 filters one or more time buckets by determining how far back to explore the supply and/or capacity to satisfy the demand and filtering the in and/or out time buckets.

In one embodiment, generation of a production plan, procurement plan, and/or a distribution plan is a post-consumption exercise. As an example only, and not by way of limitation, if demand for 10 units of end item 350 in week 4 was satisfied by consuming the following:

TABLE 11

| | Consumption in Week |
|---|---|
| component 312 @ supplier 310a | Wk1 |
| resource 326 @ manufacturer 310c | Wk2 |

Which means the following:
1. 10 units of component 312 were shipped in week1 from supplier 310a to manufacturer 310c. Component 312 reached manufacturer 310c in week2. Based on this, supply chain planner 110 will generate a distribution plan record.
2. 10 units of component 312 and resource 326 were consumed in week2 to produce end item 350 in manufacturer 310*c*. Based on this, supply chain planner 110 will generate in a production plan record.

3. 10 units of end item 350 were shipped from manufacturer 310*c* to distribution center 310*d*. Arrival at distribution center 310*d* is in week3. Based on this, supply chain planner 110 will generate a distribution plan record.

4. The demand is satisfied in week4. This means 1 week of inventory carrying. This can be used to generate inventory profile.

In one embodiment, supply chain planner 110 incrementally adjusts the supply chain plan based on one or more lot-sizing constraints stored in constraints 224 of database 220. As an example only, and not by way of limitation, if 10 units of component 312 @ supplier 310*a* need to be consumed in week3. Then components 312 will be shipped and will arrive at supplier 310*a* in week4. However, if, based on lot-sizing constraints, shipments can only be done in lot-sizes of 20, then consumption of 20 units from component 312 @ supplier 310*a* occurs in week3 and there will be a supply of 10 units in component 312 @ manufacturer 310*c* in week4. The latter accounts for the excess of 10 units in component 312 @ manufacturer 310*c* caused by lot-sizing constraints. In addition or as an alternative, supply chain planner 110 updates the supply picture in database 220.

In another embodiment, supply chain planner 110 accounts for time based safety stock by adding to the lead time while determining the valid time buckets to consume from. For example, the lead time equals the sum of all the distribution and manufacturing lead times plus all the weeks of cover required for a particular buffer and the downstream buffers.

As an example only and not by way of limitation, supply chain network 120 may also comprise three additional locations, such as, for example, a retailer, a warehouse, and another distribution center. In this example, item flow from the distribution center to the warehouse to the retailer and it takes 1 week to move the items between the locations. Although a particular time has been described, embodiments contemplate any suitable time. In addition, in this example, there is a 1 week safety stock cover at the warehouse, and a 2 week cover at the distribution center. Although a particular time has been described regarding the safety stock cover, embodiments contemplate any suitable time.

Continuing with this example, if a demand for 10 units is received in week6 at the retailer, then it can be satisfied from the retailer. In addition, or as an alternative, it can be satisfied from the warehouse by consuming 10 units in week 7. In one embodiment, this may be calculated by subtracting the lead time of 1 week and safety stock cover of 2 weeks from the demand week. It addition, it can be satisfied from the distribution center by consuming 10 units in week 5. This is calculated by subtracting the lead times of 1+1 week and safety stock cover of 2+1 weeks from the actual demand week (i.e., 10−2−3=5).

Figure 4:
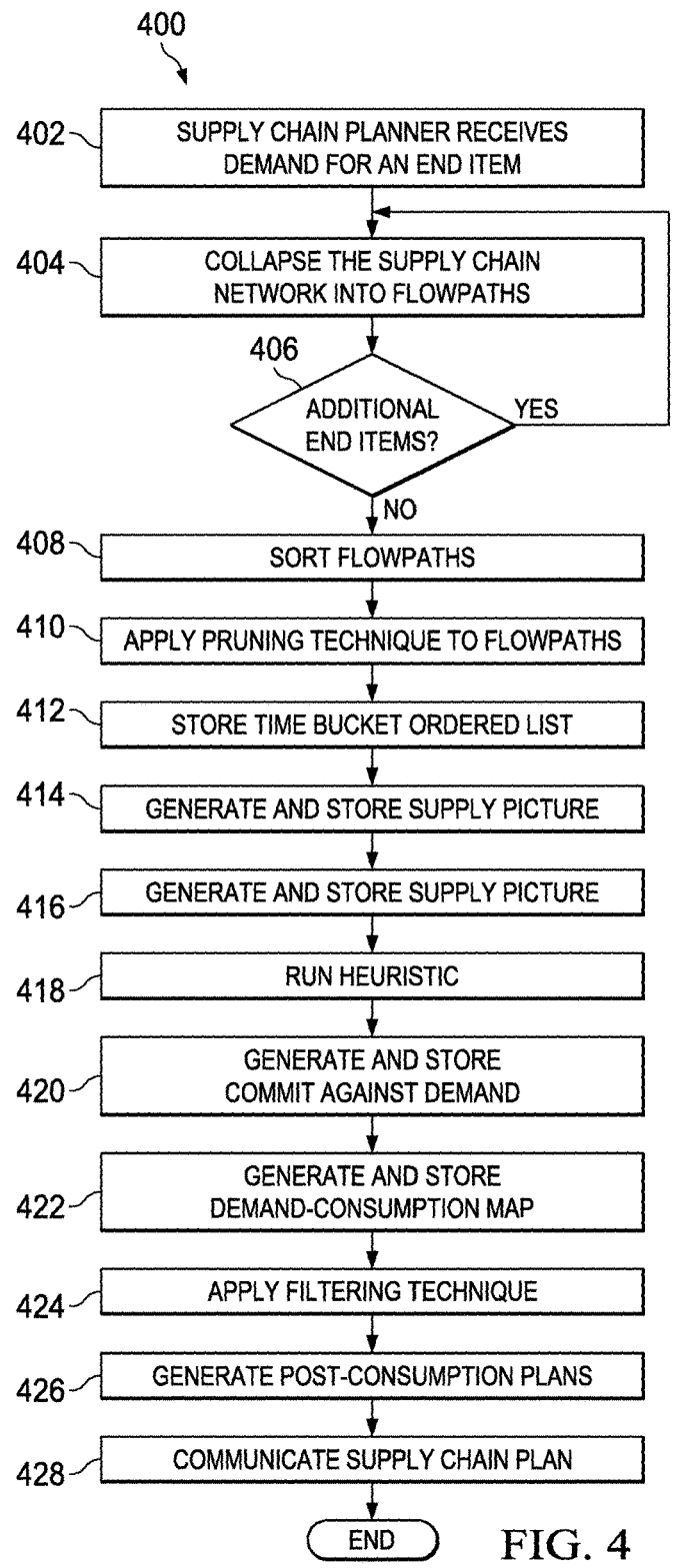
FIG. 4 illustrates an exemplary method for incremental planning using a list based heuristic.

FIG. 4 illustrates an exemplary method 400 for incremental planning using a list based heuristic. The method begins at step 402, where supply chain planner 110 receives a demand for an end item from, for example, one or more customers or other entities within supply chain network 120. At step 404, supply chain planner 110 collapses a supply chain network into one or more flowpaths for an end item and stores the generated flowpaths in database 220. As discussed above, when supply chain planner 110 receives a demand on, for example, end item 350, the demand can be satisfied by various options (i.e., flowpaths). In the above example, the demand can be satisfied from the inventory at distribution center 310*d*, or from the inventory at end item buffers 330, 332, and 334 of manufacturer 310*c*, or it can be produced at manufacturer 310*c* consuming resource 326 and 328 and components 312, 314, and 316, or it can be sourced from suppliers 310*a* and 310*b* and produced at manufacturer 310*c*.

At step 406, supply chain planner 110 determines if there is another end item that has an associated demand. If there is an additional end item, the method proceeds to step 404, otherwise the method proceeds to step 408. At step 408, supply chain planner 110 determines the order of the generated flowpaths (i.e., flowpaths 1, 2, 3, 4, etc.) by one or more business rules stored in database 220 (i.e., a sort). As discussed above, the flowpaths may be sorted based on the priority, which is determined by rules and parameters 222 stored in database 220. In addition, as discussed above, although a particular order of the flowpaths is shown and described, embodiments contemplate any suitable order of the flowpaths, according to particular needs.

At step 410, supply chain planner 110 applies one or more pruning techniques stored in rules and parameters 222 of database 220 to reduce the number of generated flowpaths. As discussed above, when supply chain planner 110 receives a demand for a particular end item for a particular time bucket, supply chain planner 110 prunes out various flowpaths based on, for example, various constraints stored in constraints 224 of database 220. In addition, or as an alternative, supply chain planner 110 prunes (i.e., removes) any time bucket(s) that do not have supply and/or capacity. At step 412, supply chain planner 110 stores the time bucket ordered list along with the flowpaths.

At step 414, supply chain planner 110 generates and stores a supply picture, which shows, for example, which time bucket the supply is received into database 220. At step 416, supply chain planner 110 generates and stores a demand picture, which shows demand (i.e., orders or netted forecasts) into database 220. In addition, as discussed above, supply chain planner 110 may prioritize the demand picture using one or more business rules stored in rules and parameters 222 of database 220.

At step 418, supply chain planner 110 uses an exemplary list based heuristic to consume demand, as per, for example, one or more business requirements stored in rules and parameters 222 of database 220 or business constraints stored in constraints 224 of database 220. At step 420, supply chain planner 110 generates and stores commit against the demand data in database 220. At step 422, supply chain planner 110 generates and stores demand-consumption map data in database 220. At step 424, supply chain planner 110 may apply a filtering technique to filter the flowpaths and time buckets. At step 426, supply chain planner 110 may generate one or more post-consumption plans, such as, for example, a production plan, a procurement plan, and/or a distribution plan. Supply chain planner 110 then communicates the incremental supply chain plan using a list based heuristic to one or more users or other entities within supply chain network 120 at step 428 and the method ends.

Figure 5:
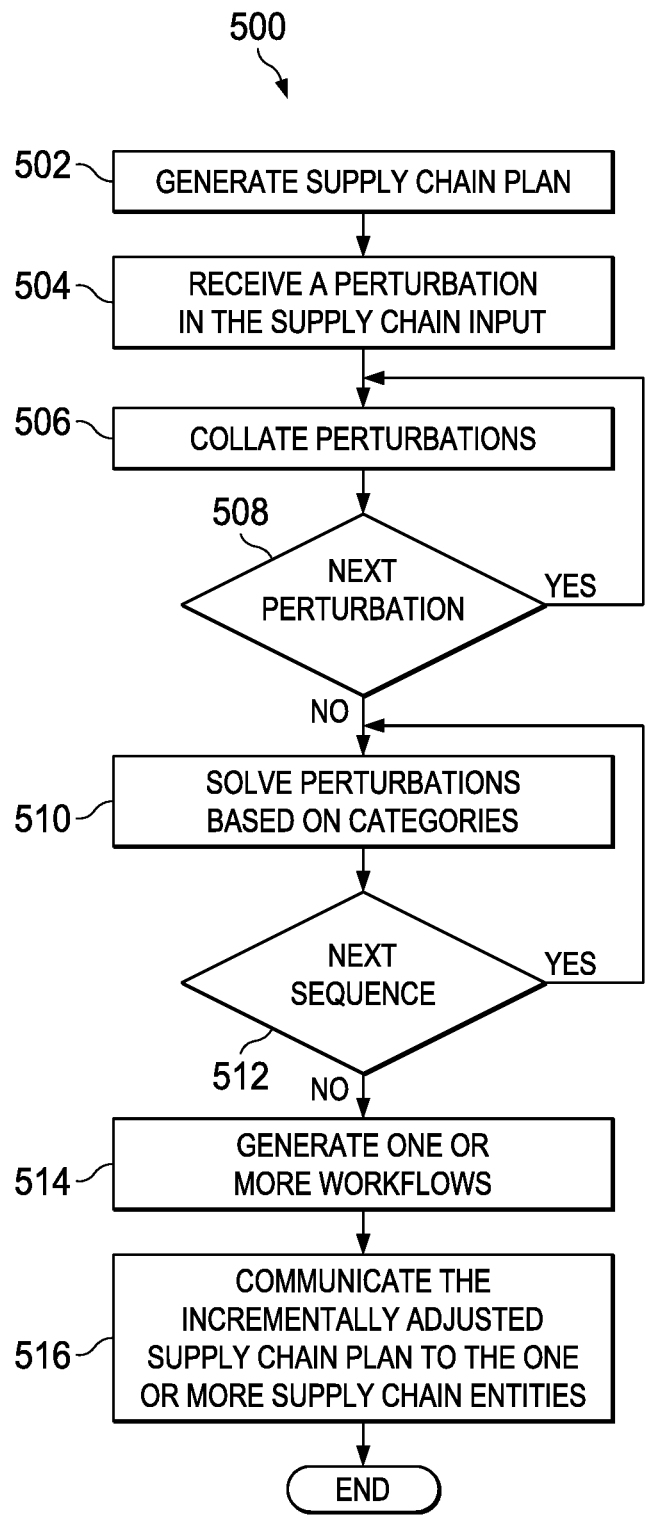
FIG. 5 illustrates an exemplary method for sentient optimization for continuous supply chain management.

FIG. 5 illustrates an exemplary method 500 for sentient optimization for continuous supply chain management. The method begins at step 502, where supply chain planner 110 generates an initial supply chain plan at a scheduled supply chain planning session. At step 504, subsequent to the generation of the supply chain plan and during a period of time separating the supply chain planning session from a subsequent supply chain planning session, a perturbation in the supply chain input is received by supply chain planner 110.

As discussed above, a perturbation in the supply chain inputs may include, but are not limited to new unforecasted orders, new orders, changes to existing orders or forecasts, changes to in-transit shipments, changes to work in progress or work in process, changes in inventory, new capacity, reduced capacity, changes to external supply, and the like. In addition, these perturbations (i.e., changes or events) may be classified into categories such as, for example, supply changes, inventory changes, capacity changes, demand changes, and the like. Although example categories of perturbations are described, embodiments contemplate any type of perturbations, changes, events, or categories of perturbations, changes, and/or events, according to particular needs.

Supply chain planner 110 collates the perturbations in the supply chain inputs at step 506 to yield a result set of net perturbations that are to be processed. If there is a next perturbation in the supply chain input at step 508, supply chain planner 110 returns to step 506 to select the perturbation. As an example only and not by way of limitation, step 508 may be required if multiple perturbations are associated with the same supply chain entity, such as, for example, increase demand quantity, decrease demand quantity, cancel order, and the like. If there is no next perturbation in the supply chain inputs at step 508, supply chain planner 110 proceeds to step 510.

At step 510, one or more solvers 214 may provide for a sequence of solving the perturbations based on the various classifications of categories of the perturbations. As an example only, and not by way of limitation, the sequence for solving the perturbations may be to solve the supply changes first, then the solve inventory changes, then solve the capacity changes, and then finally solve the demand changes. Although, an example sequence of solving the perturbations is described, one or more solvers 214 may include any suitable sequence for solving any type of perturbations in the supply chain inputs, in any particular order. In addition, or as an alternative, each solver within one or more solvers 214 may solve the perturbations using any algorithmic technique.

One or more solvers 214 may include and/or ignore infeasibilities that exist in the supply chain plan. In addition, one or more solvers 214 may solve only the infeasibilities associated with the perturbations received subsequent to the generation of the supply chain plan and during a period of time separating the supply chain planning session from a subsequent supply chain planning session. If there is another (i.e., next) sequence of solving the perturbations based on either the various classifications of categories or based on other input at step 512, supply chain planner 110 returns to step 510 to select the sequence of solving the perturbations. If there is no next sequence of solving the perturbations at step 512, supply chain planner 110 generates one or more workflows 230 to incrementally and optimally adjust the supply chain plan at step 514. Supply chain planner 110 then communicates the incrementally and optimally adjusted supply chain plan to supply chain network 120 at step 516 and the method ends.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system to reduce computational time of a computer and increase a speed of the computer processing operations, the system comprising:
   a supply chain network comprising one or more supply chain entities;
   a supplier of the one or more supply chain entities comprising one or more components, the supplier provides the one or more components to a manufacturer of the one or more supply chain entities;
   a computer coupled with a database and comprising a processor and a memory to execute instructions to:
   collapse the supply chain network into one or more flowpaths for at least one of the one or more end items, the one or more flowpaths comprising all end nodes from which consumption occurs;
   store the generated one or more flowpaths in the database;
   receive demand for one or more end items for one or more time buckets over a computer network from at least one of the one or more supply chain entities;
   load the one or more flowpaths in the memory of the computer for the received demand;
   sort an order of the one or more flowpaths based on one or more rules or parameters;
   generate a fact table based on the one or more flowpaths and the received demand, the fact table comprising the one of more flowpaths and one or more cells for each of the one or more flowpaths corresponding to the one or more time buckets;
   reduce the one or more flowpaths in the memory of the computer using one or more pruning techniques and constraints by removing one or more cells in the fact table when a supply or a capacity is not available, thereby reducing the computational time of the computer and increasing the speed of the computer processing operations;
   store the fact table in the database;
   in response to a detected change in the fact table in supply, capacity, or demand, generate a supply chain plan by solving the received demand using a list based heuristic; and
   communicate the generated supply chain plan over the computer network to at least one of the one or more supply chain entities; and
   the manufacturer comprising one or more routings, the routings comprising one or more apparatuses configured to receive the one or more components and perform at least one operation to transform the one or more components into the one or more end items, based, at least in part, on the generated supply chain plan.

2. The system of claim 1, wherein the one or more flowpaths are sorted based on a predetermined priority.

3. The system of claim 1, wherein the one or more supply chain entities are entities selected from the group consisting of the manufacturer, the supplier, a second manufacturer, a second supplier, a distribution center, a retailer, and a customer.

4. The system of claim 1, wherein the one or more supply chain entities are associated with data reflecting supply chain plans.

5. The system of claim 4, wherein the data associated with the one or more supply chain entities comprises data associated with rules, parameters, constraints, policies, supply chain planning data, flowpath data, and flowpath lists.

6. The system of claim 1, wherein the computer further executes instructions to:
generate a supply picture of when supply is received.

7. The system of claim 1, wherein the computer further executes instructions to:
generate a demand picture of when demand is forecasted.

8. A method to reduce computational time of a computer and increase a speed of the computer processing operations, the method comprising:
collapsing, by a planning engine stored on a computer comprising a database and a memory, a supply chain network into one or more flowpaths for at least one of the one or more end items, the one or more flowpaths comprising all end nodes from which consumption occurs, the supply chain network comprising one or more supply chain entities, the one or more supply chain entities comprising a supplier comprising one or more components, wherein the supplier provides the one or more components to a manufacturer, the manufacturer comprising one or more routings, the routings comprising one or more apparatuses configured to receive the one or more components and perform at least one operation to transform the one or more components into the one or more end items;
storing, by the planning engine, the generated one or more flowpaths in the database;
receiving, by the planning engine, demand for one or more end items for one or more time buckets over a computer network from at least one of the one or more supply chain entities;
loading, by the planning engine, the one or more flowpaths in the memory of the computer only in context of the received demand;
sorting, by the planning engine, an order of the one or more flowpaths based on one or more rules or parameters;
generating, by the planning engine, a fact table based on the one or more flowpaths and the received demand, the fact table comprising the one of more flowpaths and one or more cells for each of the one or more flowpaths corresponding to the one or more time buckets;
reducing, by the planning engine, the one or more flowpaths in the memory of the computer using one or more pruning techniques and constraints by removing one or more cells in the fact table when a supply or a capacity is not available, thereby reducing the computational time of the computer and increasing the speed of the computer processing operations;
generating, by the planning engine, in response to a detected change in supply, capacity, or demand in the fact table, a supply chain plan by solving the received demand using a list based heuristic;
communicating, by the planning engine, the generated supply chain plan over the computer network to at least one of the one or more supply chain entities; and
performing, by the routings, at least one operation to transform the one or more components into the one or more end items based, at least in part, on the generated supply chain plan.

9. The method of claim 8, wherein the one or more flowpaths are sorted based on a predetermined priority.

10. The method of claim 8, wherein the one or more supply chain entities are entities selected from the group consisting of the manufacturer, the supplier, a second manufacturer, a second supplier, a distribution center, a retailer, and a customer.

11. The method of claim 8, wherein the one or more supply chain entities are associated with data reflecting supply chain plans.

12. The method of claim 11, wherein the data associated with the one or more supply chain entities comprises data associated with rules, parameters, constraints, policies, supply chain planning data, flowpath data, and flowpath lists.

13. The method of claim 8 further comprising:
generating a supply picture of when supply is received.

14. The method of claim 8 further comprising:
generating a demand picture of when demand is forecasted.

15. A non-transitory computer-readable medium embodied with software to reduce computational time of a computer and increase a speed of the computer processing operations, the software when executed configured to:
collapse a supply chain network into one or more flowpaths for at least one of the one or more end items, the one or more flowpaths comprising all end nodes from which consumption occurs, the supply chain network comprising one or more supply chain entities, the one or more supply chain entities comprising a supplier comprising one or more components, wherein the supplier provides the one or more components to a manufacturer, the manufacturer comprising one or more routings, the routings comprising one or more apparatuses configured to receive the one or more components and perform at least one operation to transform the one or more components into the one or more end items;
store the generated one or more flowpaths in the database;
receive demand for one or more end items for one or more time buckets over a computer network from at least one of the one or more supply chain entities;
load the one or more flowpaths in the memory of the computer only in context of the received demand;
sort an order of the one or more flowpaths based on one or more rules or parameters;
generate a fact table based on the one or more flowpaths and the received demand, the fact table comprising the one of more flowpaths and one or more cells for each of the one or more flowpaths corresponding to the one or more time buckets;
reduce the one or more flowpaths in the memory of the computer using one or more pruning techniques and constraints by removing one or more cells in the fact table when a supply or a capacity is not available, thereby reducing the computational time of the computer and increasing the speed of the computer processing operations;
store the fact table in the database;
generate in response to a detected change in supply, capacity, or demand in the fact table, a supply chain plan by solving the received demand using a list based heuristic;
communicate the generated supply chain plan over the computer network to at least one of the one or more supply chain entities; and
perform at least one operation to transform the one or more components into the one or more end items based, at least in part, on the generated supply chain plan.

16. The non-transitory computer-readable medium of claim 15, wherein the one or more flowpaths are sorted based on a predetermined priority.

17. The non-transitory computer-readable medium of claim 15, wherein the one or more supply chain entities are entities selected from the group consisting of the manufacturer, the supplier, a second manufacturer, a second supplier, a distribution center, a retailer, and a customer.

18. The non-transitory computer-readable medium of claim 15, wherein the one or more supply chain entities are associated with data reflecting supply chain plans.

19. The non-transitory computer-readable medium of claim 18, wherein the data associated with the one or more supply chain entities comprises data associated with rules, parameters, constraints, policies, supply chain planning data, flowpath data, and flowpath lists.

20. The non-transitory computer-readable medium of claim 15, the software when executed further configured to:
   generate a supply picture of when supply is received.

21. The non-transitory computer-readable medium of claim 15, the software when executed further configured to:
   generate a demand picture of when demand is forecasted.

* * * * *